United States Patent
Husain et al.

(10) Patent No.: US 6,842,678 B2
(45) Date of Patent: Jan. 11, 2005

(54) MOTOR VEHICLE STEERING SYSTEM

(75) Inventors: Muqtada Husain, Brownstown, MI (US); Brian Daugherty, Ann Arbor, MI (US); John Oynoian, Taylor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/342,892

(22) Filed: Jan. 15, 2003

(65) Prior Publication Data

US 2004/0039508 A1 Feb. 26, 2004

Related U.S. Application Data

(63) Continuation of application No. 10/223,968, filed on Oct. 20, 2002, now Pat. No. 6,580,989.

(51) Int. Cl.$^7$ ................................................. B62D 5/04
(52) U.S. Cl. .......................... 701/41; 701/36; 180/446
(58) Field of Search ......................... 701/41, 42, 43, 701/67, 68, 36; 140/446, 402, 403, 421, 422

(56) References Cited

U.S. PATENT DOCUMENTS

| | | | |
|---|---|---|---|
| 3,256,951 | A | 6/1966 | Hart |
| 3,474,428 | A | 10/1969 | Warner et al. |
| 5,097,917 | A | 3/1992 | Serizawa et al. |
| 5,598,897 | A | 2/1997 | Sugiura |
| 5,908,457 | A | 6/1999 | Higashira et al. |
| 6,012,540 | A | 1/2000 | Bohner et al. |
| 6,053,273 | A | 4/2000 | Shimizu et al. |
| 6,116,371 | A | 9/2000 | Suyama et al. |
| 6,269,903 | B1 | 8/2001 | Bohner et al. |
| 6,370,460 | B1 | 4/2002 | Kaufmann et al. |
| 6,419,043 | B1 | 7/2002 | Duval et al. |
| 6,442,462 | B1 | 8/2002 | Nishizaki et al. |
| 6,459,971 | B1 * | 10/2002 | Kurishige et al. ............ 701/41 |
| 6,470,995 | B2 | 10/2002 | Mukai et al. |
| 6,490,514 | B2 * | 12/2002 | Kurishige et al. ............ 701/41 |
| 6,493,619 | B2 * | 12/2002 | Kawazoe et al. ............. 701/41 |
| 6,496,762 | B2 * | 12/2002 | Kurishige et al. ............ 701/41 |
| 6,505,703 | B2 * | 1/2003 | Stout et al. ................. 180/446 |
| 6,580,989 | B1 * | 6/2003 | Hussein et al. ............... 701/41 |
| 2002/0059021 | A1 | 5/2002 | Nishizaki et al. |

FOREIGN PATENT DOCUMENTS

| | | |
|---|---|---|
| EP | 1208371 A3 | 2/2002 |
| EP | 1350698 | 10/2003 |
| WO | WO 02/32742 A1 | 4/2002 |

OTHER PUBLICATIONS

SS White Technologies–*Flexible Shafts*, Jun. 30, 2003, obtained at Internet address: http://www.sswt.com/sswt/flex.html.

* cited by examiner

*Primary Examiner*—Richard M. Camby
(74) *Attorney, Agent, or Firm*—Brinks, Hofer, Gilson & Lione

(57) ABSTRACT

The present invention comprises a steering system selectively operable in one of three modes: steer-by-wire, electronic power assist steering (EPAS), and manual steering. The steer-by-wire system includes a driver interface system (DIS), a road wheel actuator system (RWAS), and a controller for monitoring and implementing the preferred control strategy. The steering system of the present invention operates normally in a steer-by-wire mode. In each of the EPAS mode and manual mode, the controller causes a clutch mechanism to engage, thus creating a mechanical linkage between the steerable member and the rack and pinion system. In the EPAS mode, one of the road wheel actuator or the reaction torque generator is available to assist in the steering operation. Alternatively, in the manual mode, both the DIS and the RWAS are deactivated and the vehicle is steerable through entirely mechanical means.

23 Claims, 8 Drawing Sheets

MOTOR VEHICLE STEERING SYSTEM

This patent application is a continuation of U.S. patent application Ser. No. 10/223,968, which was filed on Aug. 20, 2002, now U.S. Pat. No. 6,580,989.

BACKGROUND OF THE INVENTION

1. Technical Field of the Invention

The present invention relates to a steering apparatus for a vehicle that directs steerable wheels in response to operator input in which the steerable wheels are not mechanically coupled to the manually steerable member.

2. Description of the Prior Art

A typical automotive vehicle is steered by transmitting operations of a manually steerable member, such as a steering wheel, to a steering mechanism for directing steerable wheels for steering. Generally, the manually steerable member is located inside the vehicle passenger compartment, and the steerable wheels are located at the front of the vehicle. Thus, a suitable steering mechanism is necessary to couple the manually steerable member and the steerable wheels.

A representative steering mechanism is a rack-and-pinion type steering mechanism. In a rack-and-pinion steering mechanism, the rotational motion of the steering wheel is communicated through a steering column to a pinion gear at its distal end. The pinion gear is engaged with a rack gear disposed laterally between the steerable wheels, which in turn are coupled to the rack gear by knuckle arms and tie rods. In this manner, rotation of the steering wheel is translated into the lateral movement of the rack gear, which causes the steerable wheels to pivot in the desired direction. In general, mechanical steering mechanisms are power-assisted by hydraulic or electrical assist units.

In order to overcome limitations presented by mechanical steering systems, it has been proposed to utilize a steering system in which the manually steerable member is not mechanically coupled to the steerable wheels and steering movement is achieved by an electrically controlled motor, a so-called steer-by-wire system. In a steer-by-wire system, a road wheel actuator operates in response to detected values of various steering parameters, such as for example steering wheel angle, vehicle speed, vehicle lateral acceleration, and road wheel angle. The detected values are communicated electronically to the road wheel actuator from sensors, or alternatively, from a centralized controller. Upon receipt and processing of the steering command, the road wheel actuator orients the steerable wheels in the desired direction in accordance with the vehicle steering parameters.

In order to provide a steering "feel" to the vehicle operator, a typical steer-by-wire vehicle will also utilize a reaction torque generator that synthesizes and generates a reaction torque in the manually steerable member. For example, if the manually steerable member is a steering wheel, then the reaction torque generator will generally rotate a shaft coupled to the steering wheel in order to give the vehicle operator a resistive or assisting torque. In general, the magnitude and direction of the reaction torque will be determined by a control system cooperating between the reaction torque generator, the road wheel actuator, and the various vehicle sensing systems.

The adaptability of steer-by-wire systems to myriad situations provides a great number of advantages not apparent in a mechanically steered vehicle. In spite of these advantages, steer-by-wire vehicles are not dominating the current automotive marketplace. It is believed that a hybrid-type steering system is in order to ease the transition in the automotive market from mechanically coupled steering systems to steer-by-wire steering systems.

BRIEF SUMMARY OF THE INVENTION

Accordingly, the present invention comprises a steering system selectively operable in one of three modes: steer-by-wire, electronic power assist steering (EPAS), and manual steering. The steer-by-wire system includes a driver interface system (DIS), a road wheel actuator system (RWAS), and a controller for monitoring and implementing the preferred control strategy. The control architecture of the present invention reduces the total number of sensors necessary to operate a steer-by-wire vehicle, consequently reducing the overall cost of the vehicle steering system.

The DIS includes a steerable member that is rotatable about a shaft. The rotation of the steerable member and the shaft is measured by a steering wheel angle sensor, disposed about the shaft. The shaft is coupled to a reaction torque generator for generating a steering feel based upon the applicable steering parameters, such as the vehicle speed, steering wheel angle, yaw rate, rack load, and lateral acceleration.

The RWAS includes a road wheel actuator responsive to control commands from the controller. The road wheel actuator is operatively coupled to a rack and pinion type steering system. Through the controller, the road wheel actuator rotates the pinion gear, which in turn causes the lateral motion of the rack gear thereby steering the road wheels. Like the DIS, the performance of the RWAS is monitored by a plurality of sensors.

The steering system of the present invention operates normally in a steer-by-wire mode, in which information regarding the angular position of the steerable member is combined with other pertinent information to compute a control signal, which the controller directs to the road wheel actuator. As noted, the road wheel actuator then mechanically steers the road wheels through the rack and pinion mechanism of the RWAS. However, the steering system is also adapted for operation in an electronic power assist steering (EPAS) mode and a manual mode in response to a malfunction in any part component of the DIS or RWAS subsystems.

In each of the EPAS mode and manual mode, the controller causes a clutch mechanism to engage, thus creating a mechanical linkage between the steerable member and the rack and pinion system. In the EPAS mode, one of the road wheel actuator or the reaction torque generator is available to assist in the steering operation. Alternatively, in the manual mode, both the DIS and the RWAS are deactivated and the vehicle is steerable through entirely mechanical means. In the event that the system power is cut off or the vehicle is not running, the steering system of the present invention is operable in the manual mode.

DETAILED DESCRIPTION OF THE INVENTION

Figure 1:
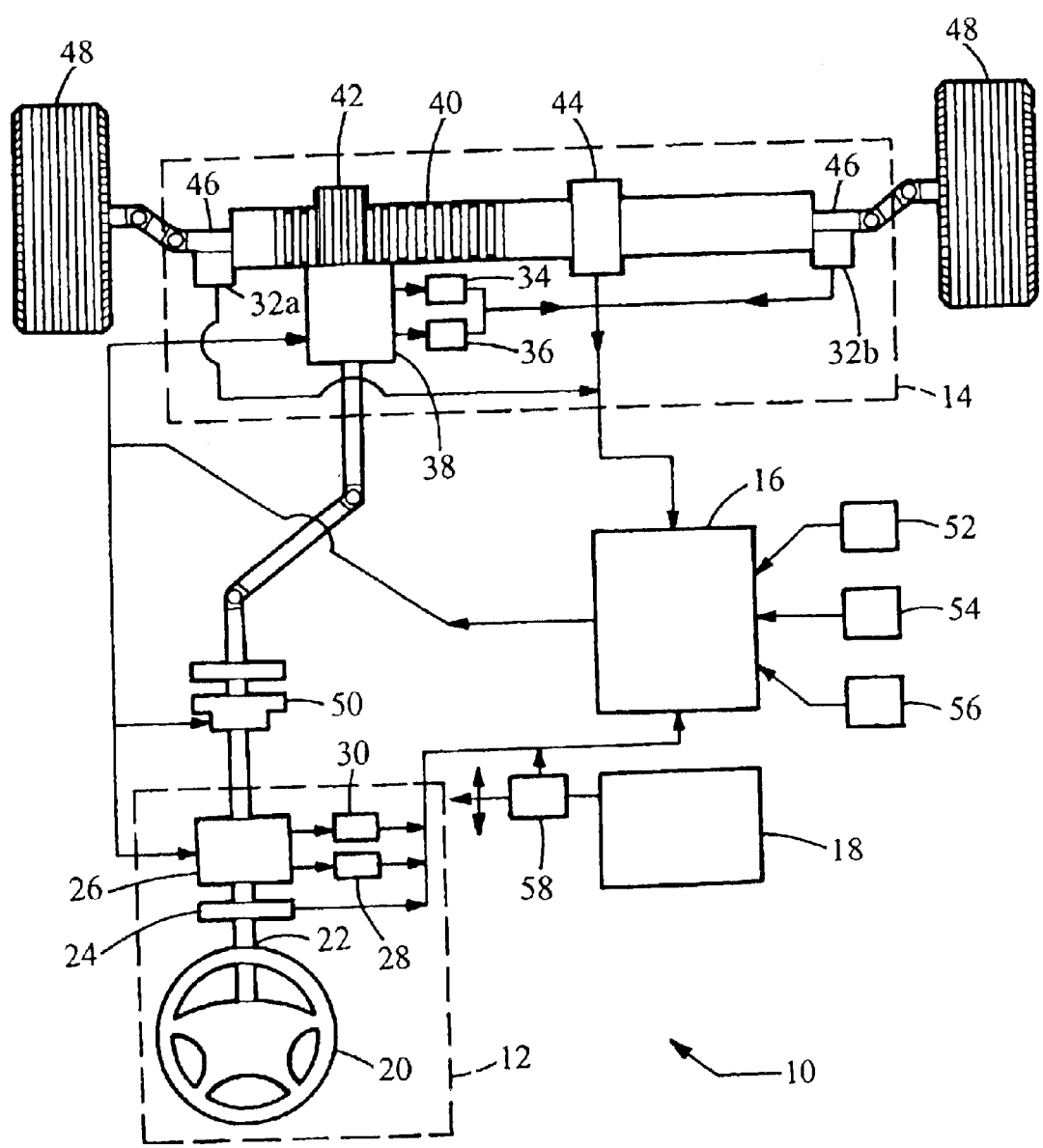
FIG. 1 is a schematic block diagram of a steering system in accordance with a preferred embodiment of the present invention.

In accordance with a preferred embodiment of the present invention, FIG. 1 depicts a schematic block diagram of the steer-by-wire system 10 of the present invention. The steer-by-wire system 10 includes as its primary components a driver interface system (DIS) 12, a road wheel actuator system (RWAS) 14, and a controller 16 for monitoring and controlling the respective systems. The control architecture of the steer-by-wire system 10 of the present invention is based upon the operational independence of the DIS 12 and the RWAS 14. The steer-by-wire system 10 is powered by a battery 18, which provides electrical power to the various electrical components herein.

The DIS 12 includes a steerable member 20 that is rotatable about a shaft 22. The shaft 22 extends from the steerable member 20 towards the RWAS 14. Between the shaft 22 and the RWAS 14 is a clutch mechanism 50, the control of which is discussed further herein. The rotation of the steerable member 20 and the shaft 22 is measured by a steering wheel angle sensor 24, disposed about the shaft 22. In a preferred embodiment, the steering wheel angle sensor 24 as shown includes at least one independent sensing unit, such that measurement redundancy is ensured. The shaft 22 is coupled to a reaction torque generator 26, the operation of which is controlled by the controller 16.

The reaction torque generator 26 generates a prescribed torque upon the shaft 22, thus providing either resistance or assistance to a vehicle operator in rotating the steerable member 20. The performance of the reaction torque generator 26 is monitored by a pair of condition sensors. A reaction torque generator current sensor 28 measures the amount of current utilized by the reaction torque generator, and conveys that measurement to the controller 16. Similarly, a reaction torque generator temperature sensor 30 monitors the temperature of the reaction torque generator 26 and communicates measurements to the controller 16. The foregoing sensors and other sensors associated with the DIS 12 may be referred to herein as the "steering sensors".

The RWAS 14 includes a road wheel actuator 38 responsive to control commands from the controller 16. The road wheel actuator 38 is operatively coupled to a pinion gear 42, which is in turn engaged to a rack gear 40 displaced about a transverse axis of the motor vehicle. The rack gear 40 is coupled to or part of an axle 46, which extends laterally across the motor vehicle to a location suitable for the road wheels 48. Through the controller 16, the road wheel actuator 38 rotates the pinion gear 42, which in turn causes the lateral motion of the rack gear 40, and through a typical steering and suspension system, the pivoting and steering of the road wheels 48.

The performance of the RWAS 14 is monitored by a plurality of sensors. Road wheel position sensors 32a, 32b, are adapted for measuring or estimating the angular position of the road wheels 48 and communicating this value to the controller 16. During steering operation, a rack load sensor 44 measures the load on the rack gear 40, a value that is also transmitted to the controller 16. The operating conditions of the road wheel actuator 38 are monitored by a road wheel actuator temperature sensor 36 and a road wheel actuator current sensor 34. The foregoing sensors and other sensors associated with the RWAS 14 may be referred to herein as the "road wheel sensors".

The steering system 10 of the present invention includes additional components, including a yaw rate sensor 52, a lateral acceleration sensor 54, and a vehicle speed sensor 56. The foregoing sensors are directed primarily at the measurement or estimation of vehicle parameters, and are thus utilized primarily for maximizing the system's steering performance. Additionally, a battery current sensor 58 detects the electrical current available to the steering system 10, and conveys this value to the controller 16.

The steering system 10 operates normally in a steer-by-wire mode, in which information regarding the angular position of the steerable member 20 is combined with other pertinent information to compute a control signal, which the controller 16 directs to the road wheel actuator 38. As noted, the road wheel actuator 38 then mechanically steers the road wheels 48 through the rack and pinion mechanism of the RWAS 14.

However, the steering system 10 is also adapted for operation in an electronic power assist steering (EPAS) mode and a manual mode. Operation in these alternate modes is determined by the controller 16 in response to a malfunction in any part of either the DIS 12 or the RWAS 14. If the battery 18 is unable to supply sufficient electrical current, or if the steering system 10 of the present invention is powered down, then the lack of electrical power causes the clutch mechanism 50 to engage.

In each of the EPAS mode and manual mode, the controller 16 causes the clutch mechanism 50 to engage, thus connecting the shaft 22 to the pinion gear 42. One of the road wheel actuator 38 or the reaction torque generator 26 is available to assist the rotation of the shaft 22 and the pinion gear 42 in the EPAS mode. In the manual mode, both road wheel actuator 38 and the reaction torque generator 26 are deactivated, and rotation of the pinion gear 42 is accomplished solely by manual rotation of the shaft 22. The control scheme for the steer-by-wire mode, EPAS mode, and manual mode is discussed further herein with reference to FIGS. 2–8.

Figure 2:
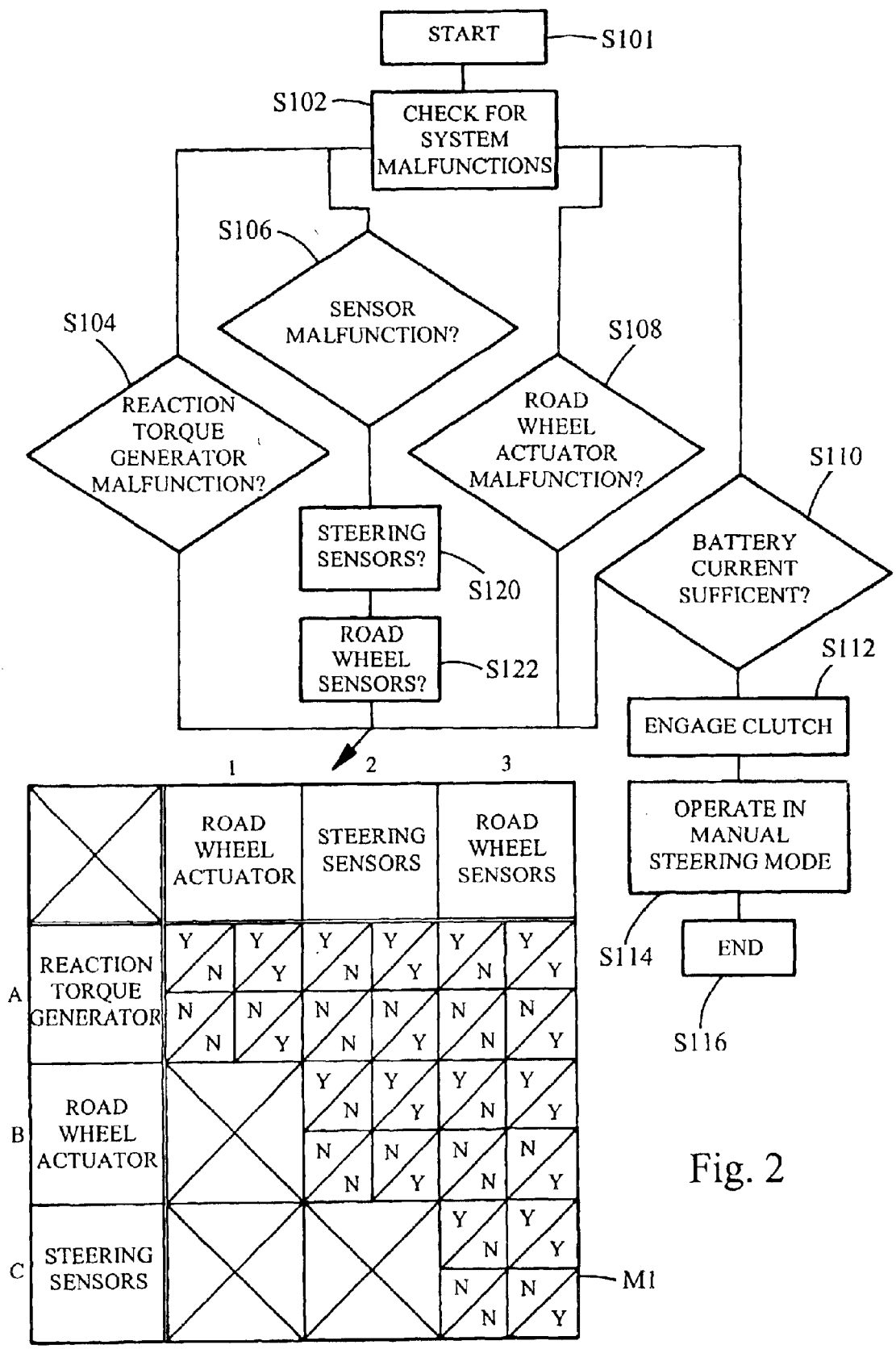
FIG. 2 is a flowchart depicting the top-level controls of the steering system of the present invention, including a decision matrix for system controls.

FIG. 2 is a high-level flowchart for the diagnosis and remedy of malfunctions in the steering system 10 of the present invention, beginning with step S101 and step S102, in which the controller 16 checks for system malfunctions. Due to the complexity of the steering system 10, the controller 16 checks for system malfunctions in three dependent domains: the reaction torque generator in step S104, the sensors in step S106, and the road wheel actuator in step S108. With respect to the sensors, the controller 16 inquires as to the functional state of the steering sensors in step S120 and the road wheel sensors in step S122. Because the DIS 12 and the RWAS 14 are comprised of the foregoing actuators and sensors, a more detailed cross-comparison analysis is necessary.

The functional interdependence of steps S104, S120, S122, and S108 is demonstrated clearly in matrix M1. Although any one malfunction is sufficient for the controller 16 to engage the clutch mechanism 50, it is necessary for the controller 16 to further inquire as to the state of other dependent and independent subsystems. For example, a malfunction of the steering wheel angle sensor 24 alone will render the entire DIS 12 inoperable, and thus the clutch mechanism 50 will be engaged. A second malfunction of the reaction torque generator 26 will also render the DIS 12 inoperable, but the controller 16 is not required to take any further mitigating action. In contrast, a third malfunction of the rack load sensor 44 will render the RWAS 14 inoperable, and thus the controller 16 must prepare the steering system 10 for operation in a manual mode.

Consequently, each of the reaction torque generator, road wheel actuator, steering sensors, and road wheel sensors respective conditions are necessary to implement a control strategy. Matrix M1 presents a tabled listing of the possible outcomes of malfunction inquires into these respective domains. For example, submatrix A1 shows the interdependence between the reaction torque generator and the road wheel actuator, resulting in four possible combinatorial outcomes: Y/Y, Y/N, N/Y, and N/N. Similarly, submatricies A2, A3, B2, B3, and C3 show the combinatorial outcomes of the inquiries into the respective domains, as detailed in FIGS. 3–8.

Before proceeding to a detailed discussion of the interdependence of the DIS 12 and RWAS 14, as shown in FIG. 2, in step S110 the controller 16 inquires as to the sufficiency of the battery current. The battery 18 is independent from the other systems, and thus any insufficiency of battery current will result in the mechanical clutch being engaged as shown in step S112. Without sufficient electrical current, the controller 16 does not have an available EPAS mode in which to operate, and thus the steering system 10 must be operated in a pure manual mode as shown in step S114. The controller 16 then resumes the normal monitoring and control of the steering system 10 in step S116. If the battery current is sufficient, then the controller 16 proceeds to matrix M1, which is followed by the relevant submatricies.

Figure 3:
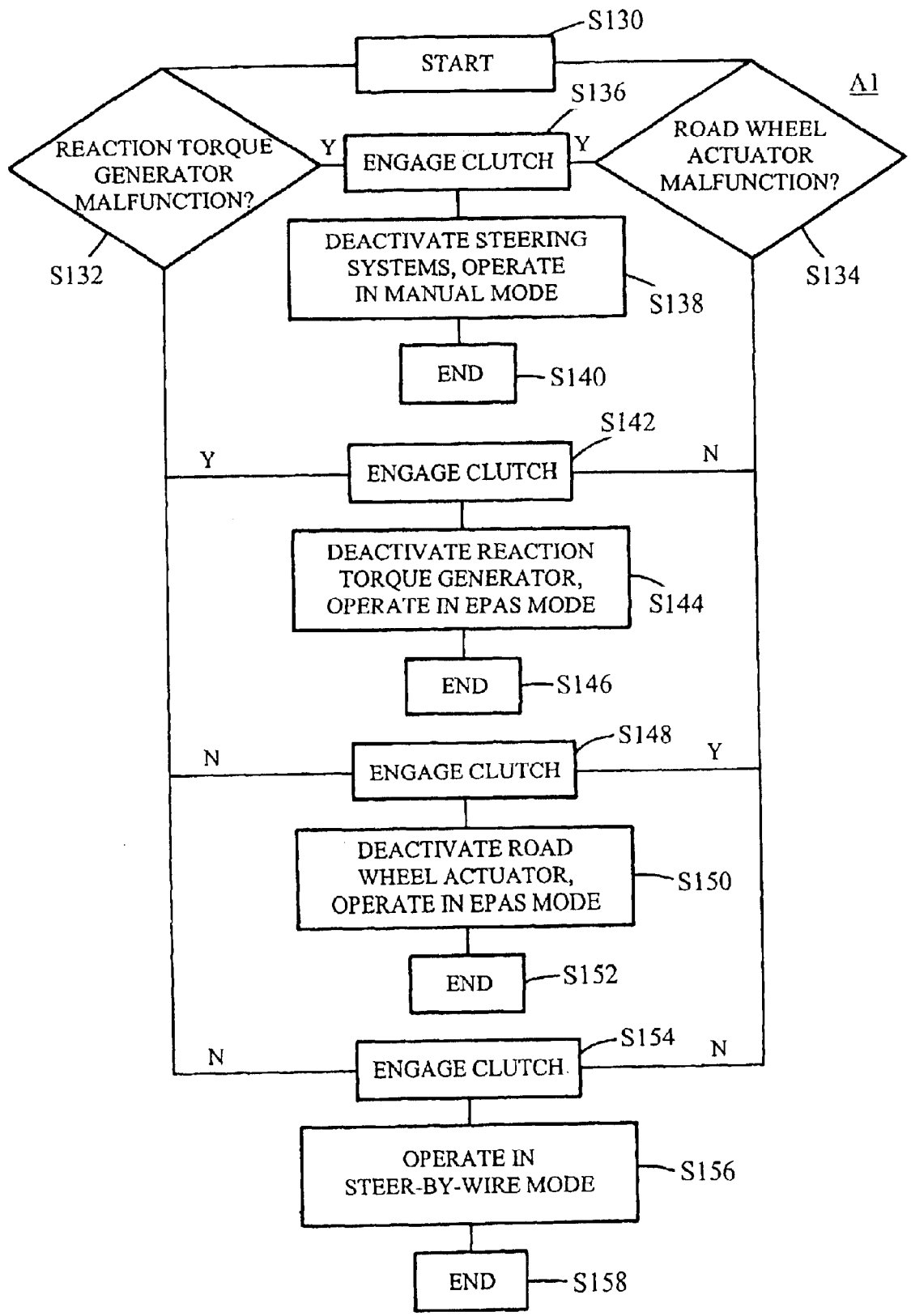
FIG. 3 is a flowchart depicting a submatrix control scheme for the A1 submatrix.

FIG. 3 is a flowchart summarizing the control algorithm executed in submatrix A1, starting with step S130. The controller 16 inquires as to the functional capacity of the reaction torque generator in step S132 and the road wheel actuator in step S134. If, as in step S136, there is a malfunction of both the reaction torque generator 26 and the road wheel actuator 38, the clutch mechanism 50 is engaged. In step S138, the controller 16 deactivates the RWAS 14 and the DIS 12 and operates the steering system 10 in a manual mode. The controller 16 then resumes normal monitoring and control functions in step S140.

If, as in step S142, the reaction torque generator 26 malfunctions but the road wheel actuator 38 is functional, the controller 16 engages the clutch mechanism 50. Because the DIS 12 is not functional, the controller 16 deactivates it and operates the vehicle in a EPAS mode with the road wheel actuator 38 providing the electronic power assist as shown in step S144. The controller 16 then resumes normal monitoring and control functions in step S146.

If, as in step S148, the reaction torque generator 26 is functional but the road wheel actuator 38 is not functional, the controller engages the clutch mechanism 50. Because the RWAS 14 is not functional, the controller 16 deactivates it and operates the vehicle in a EPAS mode with the reaction torque generator 26 providing the electronic power assist as shown in step S150. The controller 16 then resumes normal monitoring and control functions in step S152.

If neither the reaction torque generator 26 nor the road wheel actuator 38 malfunction, as shown in step S154, then the controller 16 maintains the clutch mechanism 50 in a disengaged state. The steering system 10 is then operated in a steer-by-wire mode as shown in step S156 and the controller 16 resumes normal monitoring and control functions in step S158.

Figure 4:
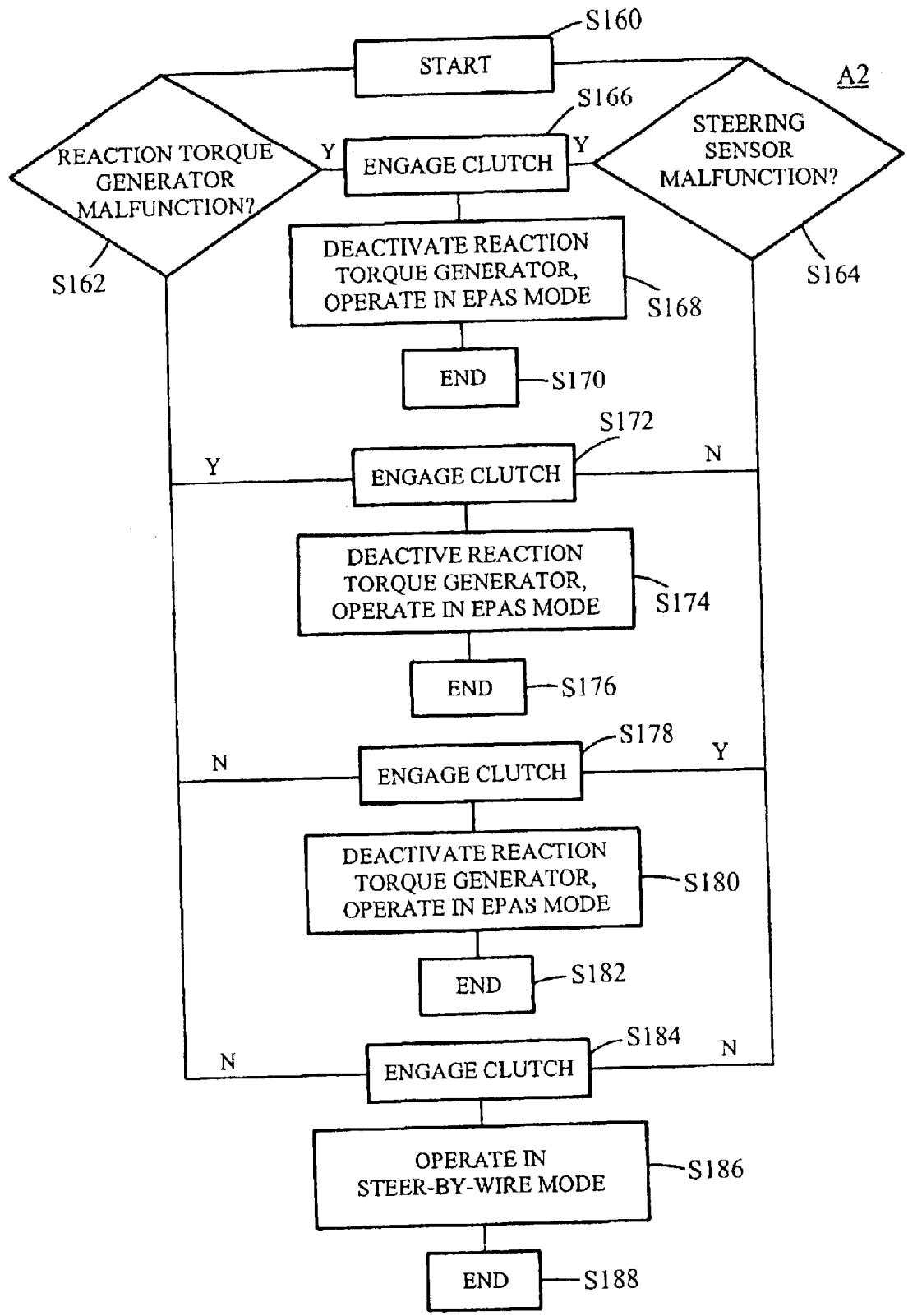
FIG. 4 is a flowchart depicting a submatrix control scheme for the A2 submatrix.

FIG. 4 is a flowchart summarizing the control algorithm executed in submatrix A2, starting with step S160. The controller 16 inquires as to the functional capacity of the reaction torque generator in step S162 and the steering sensors in step S164. If, as in step S166, there is a malfunction of both the reaction torque generator 26 and one of the various steering sensors, the clutch mechanism 50 is engaged. In step S168, the controller 16 deactivates the DIS 12 and operates the steering system 10 in a EPAS mode with the road wheel actuator 38 providing the electronic power assist. The controller 16 then resumes normal monitoring and control functions in step S170.

If, as in step S172, the reaction torque generator 26 malfunctions but the steering sensors are functional, the controller 16 engages the clutch mechanism 50. Because the DIS 12 is not functional, the controller 16 deactivates it and operates the vehicle in a EPAS mode with the road wheel actuator 38 providing the electronic power assist as shown in step S174. The controller 16 then resumes normal monitoring and control functions in step S176.

If, as in step S178, the reaction torque generator 26 is functional but the steering sensors are not functional, the controller engages the clutch mechanism 50. Because the DIS 12 is not functional, the controller 16 deactivates it and operates the vehicle in a EPAS mode with the road wheel actuator 38 providing the electronic power assist as shown in step S180. The controller 16 then resumes normal monitoring and control functions in step S182.

If neither the reaction torque generator 26 nor the steering sensors malfunction, as shown in step S184, then the controller 16 maintains the clutch mechanism 50 in a disengaged state. The steering system 10 is then operated in a steer-by-wire mode as shown in step S186 and the controller 16 resumes normal monitoring and control functions in step S188.

Figure 5:
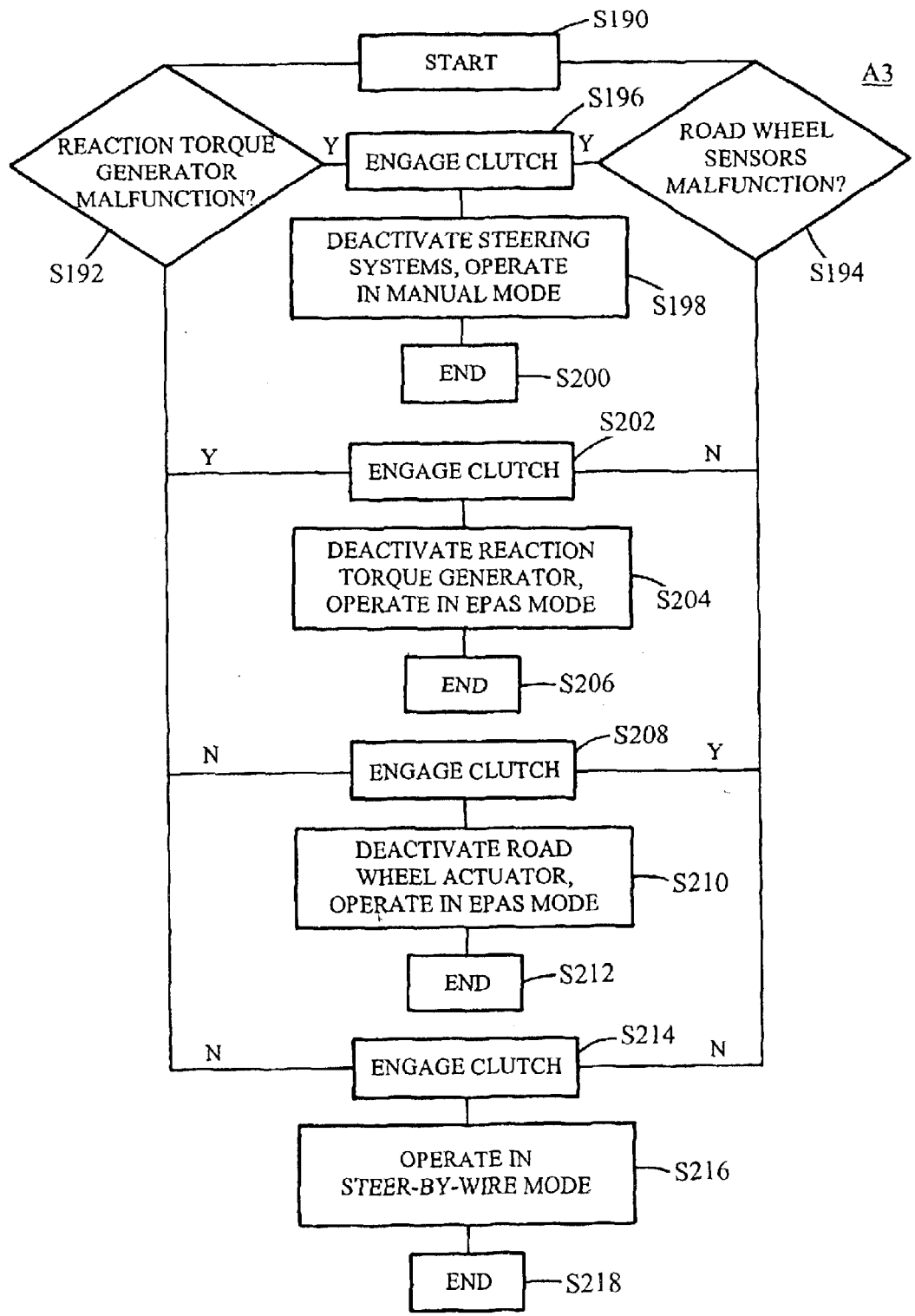
FIG. 5 is a flowchart depicting a submatrix control scheme for the A3 submatrix.

FIG. 5 is a flowchart summarizing the control algorithm executed in submatrix A3, starting with step S190. The controller 16 inquires as to the functional capacity of the reaction torque generator in step S192 and the road wheel sensors in step S194. If, as in step S196, there is a malfunction of both the reaction torque generator 26 and the road wheel sensors, the clutch mechanism 50 is engaged. In step S198, the controller 16 deactivates the RWAS 14 and the DIS 12 and operates the steering system 10 in a manual mode. The controller 16 then resumes normal monitoring and control functions in step S200.

If, as in step S202, the reaction torque generator 26 malfunctions but the road wheel sensors are functional, the controller 16 engages the clutch mechanism 50. Because the DIS 12 is not functional, the controller 16 deactivates it and operates the vehicle in a EPAS mode with the road wheel actuator 38 providing the electronic power assist as shown in step S204. The controller 16 then resumes normal monitoring and control functions in step S206.

If, as in step S208, the reaction torque generator 26 is functional but the road wheel sensors are not functional, the controller engages the clutch mechanism 50. Because the RWAS 14 is not functional, the controller 16 deactivates it and operates the vehicle in a EPAS mode with the reaction torque generator 26 providing the electronic power assist as shown in step S210. The controller 16 then resumes normal monitoring and control functions in step S212.

If neither the reaction torque generator 26 nor the road wheel sensors malfunction, as shown in step S214, then the controller 16 maintains the clutch mechanism 50 in a disengaged state. The steering system 10 is then operated in a steer-by-wire mode as shown in step S216 and the controller 16 resumes normal monitoring and control functions in step S218.

Figure 6:
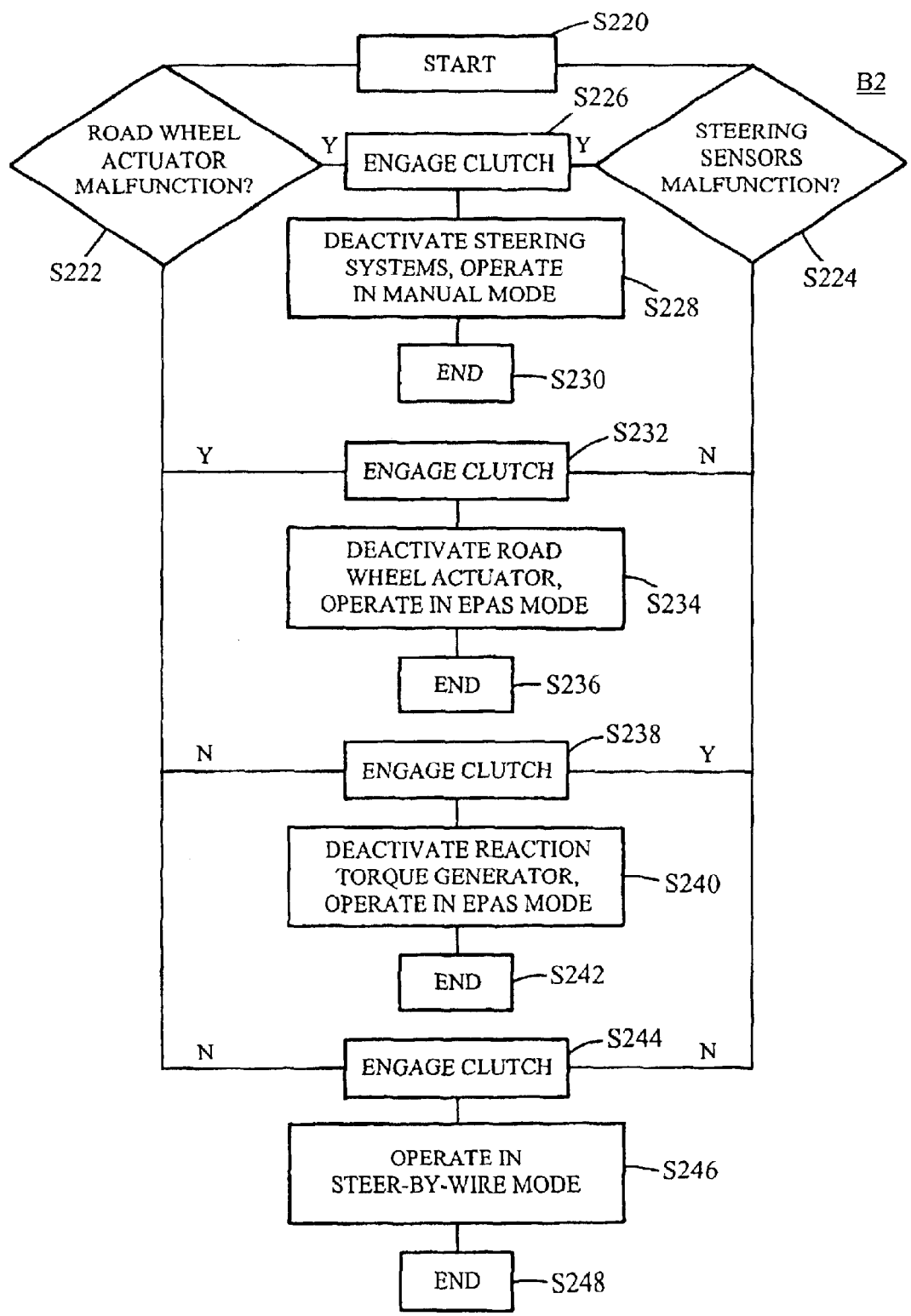
FIG. 6 is a flowchart depicting a submatrix control scheme for the B2 submatrix.

FIG. 6 is a flowchart summarizing the control algorithm executed in submatrix B2, starting with step S220. The controller 16 inquires as to the functional capacity of the road wheel actuator 38 in step S222 and the steering sensors in step S224. If, as in step S226, there is a malfunction of both the road wheel actuator 38 and the steering sensors, the clutch mechanism 50 is engaged. In step S228, the controller 16 deactivates the RWAS 14 and the DIS 12 and operates the steering system 10 in a manual mode. The controller 16 then resumes normal monitoring and control functions in step S230.

If, as in step S232, the road wheel actuator 38 malfunctions but the steering sensors are functional, the controller 16 engages the clutch mechanism 50. Because the RWAS 12 is not functional, the controller 16 deactivates it and operates the vehicle in a EPAS mode with the reaction torque generator 26 providing the electronic power assist as shown in step S234. The controller 16 then resumes normal monitoring and control functions in step S236.

If, as in step S238, the road wheel actuator 38 is functional but the steering sensors are not functional, the controller engages the clutch mechanism 50. Because the DIS 14 is not functional, the controller 16 deactivates it and operates the vehicle in a EPAS mode with the road wheel actuator 38 providing the electronic power assist as shown in step S240. The controller 16 then resumes normal monitoring and control functions in step S242.

If neither the road wheel actuator 38 nor the steering sensors malfunction, as shown in step S244, then the controller 16 maintains the clutch mechanism 50 in a disengaged state. The steering system 10 is then operated in a steer-by-wire mode as shown in step S246 and the controller 16 resumes normal monitoring and control functions in step S248.

Figure 7:
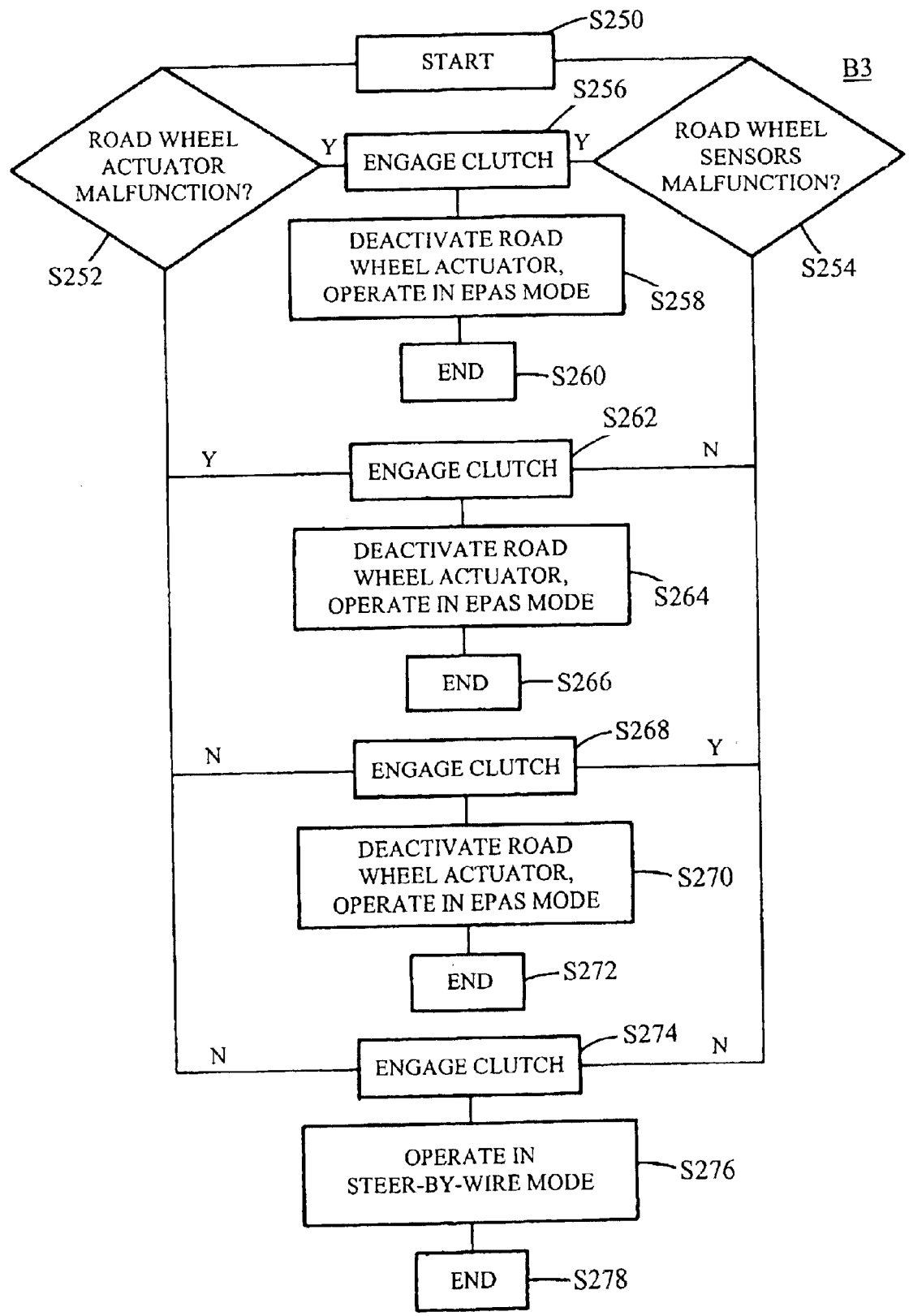
FIG. 7 is a flowchart depicting a submatrix control scheme for the B3 submatrix.

FIG. 7 is a flowchart summarizing the control algorithm executed in submatrix B3, starting with step S250. The controller 16 inquires as to the functional capacity of the road wheel actuator 38 in step S252 and the road wheel sensors in step S254. If, as in step S256, there is a malfunction of both the road wheel actuator 38 and one of the various road wheel sensors, the clutch mechanism 50 is engaged. In step S258, the controller 16 deactivates the RWAS 14 and operates the steering system 10 in an EPAS mode with the reaction torque generator 26 providing the electronic power assist. The controller 16 then resumes normal monitoring and control functions in step S260.

If, as in step S262, the road wheel actuator 38 malfunctions but the road wheel sensors are functional, the controller 16 engages the clutch mechanism 50. Because the RWAS 14 is not functional, the controller 16 deactivates it and operates the steering system 10 in an EPAS mode with the reaction torque generator 26 providing the electronic power assist as shown in step S264. The controller 16 then resumes normal monitoring and control functions in step S266.

If, as in step S268, the road wheel actuator 38 is functional but the road wheel sensors are not functional, the controller engages the clutch mechanism 50. Because the RWAS 12 is not functional, the controller 16 deactivates it and operates the vehicle in a EPAS mode with the reaction torque generator 26 providing the electronic power assist as shown in step S270. The controller 16 then resumes normal monitoring and control functions in step S272.

If neither the road wheel actuator 38 nor the road wheel sensors malfunction, as shown in step S274, then the controller 16 maintains the clutch mechanism 50 in a disengaged state. The steering system 10 is then operated in a steer-by-wire mode as shown in step S276 and the controller 16 resumes normal monitoring and control functions in step S278.

Figure 8:
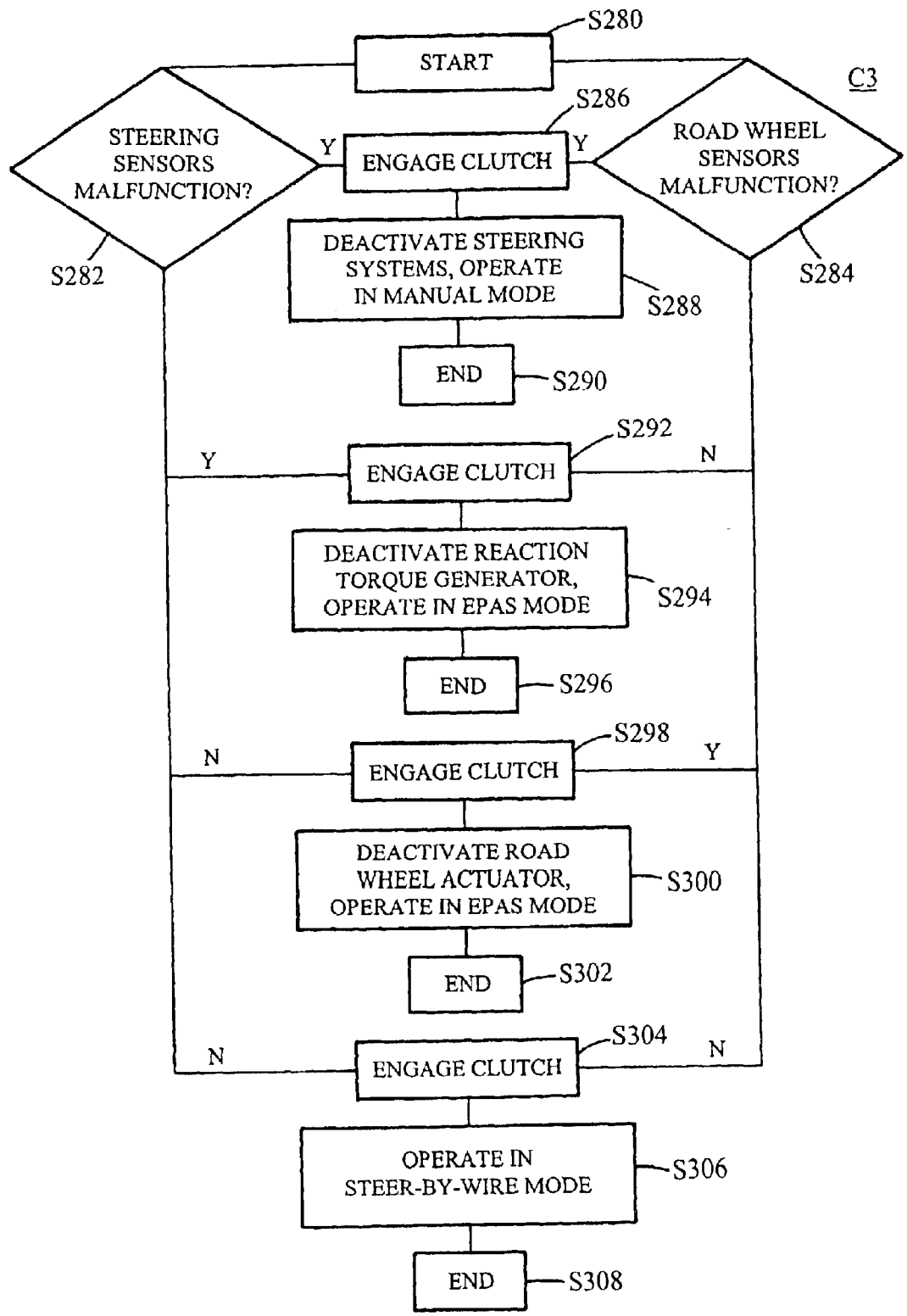
FIG. 8 is a flowchart depicting a submatrix control scheme for the C3 submatrix.

FIG. 8 is a flowchart summarizing the control algorithm executed in submatrix C3, starting with step S280. The controller 16 inquires as to the functional capacity of the steering sensors in step S282 and the road wheel sensors in step S284. If, as in step S286, there is a malfunction of both the steering sensors and the road wheel sensors, the clutch mechanism 50 is engaged. In step S288, the controller 16 deactivates the RWAS 14 and the DIS 12 and operates the steering system 10 in a manual mode. The controller 16 then resumes normal monitoring and control functions in step S290.

If, as in step S292, the steering sensors malfunction but the road wheel sensors are functional, the controller 16 engages the clutch mechanism 50. Because the DIS 12 is not functional, the controller 16 deactivates it and operates the vehicle in a EPAS mode with the road wheel actuator 38 providing the electronic power assist as shown in step S294. The controller 16 then resumes normal monitoring and control functions in step S296.

If, as in step S298, the steering sensors are functional but the road wheel sensors are not functional, the controller engages the clutch mechanism 50. Because the RWAS 14 is not functional, the controller 16 deactivates it and operates the vehicle in a EPAS mode with the reaction torque generator 26 providing the electronic power assist as shown in step S300. The controller 16 then resumes normal monitoring and control functions in step S302.

If neither the steering sensors nor the road wheel sensors malfunction, as shown in step S304, then the controller 16 maintains the clutch mechanism 50 in a disengaged state. The steering system 10 is then operated in a steer-by-wire mode as shown in step S306 and the controller 16 resumes normal monitoring and control functions in step S308.

The present invention as described in its preferred embodiment thus provides a steering system capable of operation in one of three modes: steer-by-wire, EPAS, and manual steering. The control of each steering mode and the transition between the respective steering modes is determined according to the various control schemes presented herein. It should be apparent to those skilled in the art that the above-described embodiment is merely illustrative of but a few of the many possible specific embodiments of the present invention. Numerous and various other arrangements can be readily devised by those skilled in the art without departing from the spirit and scope of the invention as defined in the following claims.

What is claimed is:

1. A method of steering a vehicle, the method comprising the steps of:
 providing a vehicle capable of operating in a steer-by-wire mode, an electronic power assist mode, and a manual mode;
 determining a steering value;
 controlling a road wheel actuator system in accordance with the steering value, thereby steering the vehicle;
 generating steering reaction torque in a driver interface system corresponding to the steering value;

monitoring the road wheel actuator system and the driver interface system;

operating in one of a steer-by-wire mode, an electronic power assist (EPAS) mode, or a manual mode changing from a steer-by-wire mode to one of an electronic power assist (EPAS) mode or a manual mode; and engaging a clutch mechanism in response to the detecting of a malfunction in one of the road wheel actuator system or the driver interface system.

2. The method of claim 1 further comprising the steps of determining an angular position of a steerable member, a reaction torque generator current, and a reaction torque generator temperature.

3. The method of claim 1 further comprising the steps of monitoring the position of at least one road wheel, a road wheel actuator current, a road wheel actuator temperature, and a rack load.

4. The method of claim 1 further comprising the steps of receiving a set input signals indicative of at least a vehicle speed value, a lateral acceleration value, a yaw rate value, and an ignition mode.

5. The method of claim 1 further comprising the steps of controlling one of the reaction torque generator or the road wheel actuator to generate an assistive torque on the steerable member in the EPAS mode.

6. The method of claim 1 further comprising the step of deactivating the reaction torque generator and controlling the road wheel actuator to provide electronic steering power assist in response to a driver interface system malfunction.

7. The method of claim 6 wherein the driver interface system malfunction includes at least one selected from the group of a reaction torque generator malfunction, an angular position sensor malfunction, a reaction torque generator current sensor malfunction, or a reaction torque, generator temperature sensor malfunction.

8. The method of claim 6 wherein the driver interface system malfunction includes a reaction torque generator malfunction.

9. The method of claim 6 wherein the driver interface system malfunction includes an angular position sensor malfunction.

10. The method of claim 6 wherein the driver interface system malfunction includes a reaction torque generator current sensor malfunction.

11. The method of claim 6 wherein the driver interface system malfunction includes a reaction torque generator temperature sensor malfunction.

12. The method of claim 1 further comprising the step of deactivating the road wheel actuator and controlling the reaction torque generator to provide electronic steering power assist in response to a road wheel actuator system malfunction.

13. The method of claim 12 wherein the road wheel actuator system malfunction includes at least one selected from the group of a road wheel actuator malfunction, a road wheel position sensor malfunction, a road wheel actuator current sensor malfunction, a road wheel actuator temperature sensor malfunction, or a rack load sensor malfunction.

14. The method of claim 12 wherein the road wheel actuator system malfunction includes a road wheel actuator malfunction.

15. The method of claim 12 wherein the road wheel actuator system malfunction includes a road wheel position sensor malfunction.

16. The method of claim 12 wherein the road wheel actuator system malfunction includes a road wheel actuator current sensor malfunction.

17. The method of claim 12 wherein the road wheel actuator system malfunction includes a road wheel actuator temperature sensor malfunction.

18. The method of claim 12 wherein the road wheel actuator system malfunction includes a rack load sensor malfunction.

19. The method of claim 1 further comprising the step of deactivating the reaction torque generator and the road wheel actuation in response to a driver interface system malfunction and a road wheel actuator system malfunction.

20. The method of claim 19 further comprising the step of engaging the clutch mechanism in response to a driver interface system malfunction and a road wheel actuator system malfunction.

21. The method of claim 1 further comprising the step of monitoring fluctuations in a battery current.

22. The method of claim 21 further comprising the step of deactivating the reaction torque generator and The road wheel actuator, and further comprising the step of engaging the clutch mechanism in response to a threshold battery current value.

23. A method of steering a vehicle, the method comprising the steps of:

providing a vehicle capable of operating in a steer-by-wire mode, an electronic power assist mode, and a manual mode;

determining a steering value;

controlling a road wheel actuator system in accordance with the steering value, thereby steering the vehicle;

generating steering reaction torque in a driver interface system corresponding to the steering value;

monitoring the road wheel actuator system and the driver interface system; and changing from a steer-by-wire mode to one of an electronic power assist (EPAS) mode or a manual mode.

* * * * *

UNITED STATES PATENT AND TRADEMARK OFFICE
CERTIFICATE OF CORRECTION

PATENT NO. : 6,842,678 B2
DATED : January 11, 2005
INVENTOR(S) : Muqtada Husain et al.

It is certified that error appears in the above-identified patent and that said Letters Patent is hereby corrected as shown below:

<u>Title page,</u>
Item [56], References Cited, FOREIGN PATENT DOCUMENTS, delete "1208371" and substitute -- 1205371 -- in its place.

<u>Column 10,</u>
Line 2, delete "and The" and substitute -- and the -- in its place.

Signed and Sealed this

Seventh Day of June, 2005

JON W. DUDAS
*Director of the United States Patent and Trademark Office*